Nov. 17, 1953   G. T. HARRISON   2,659,338
MACHINE FOR COATING RAW OYSTERS
Filed Oct. 30, 1951
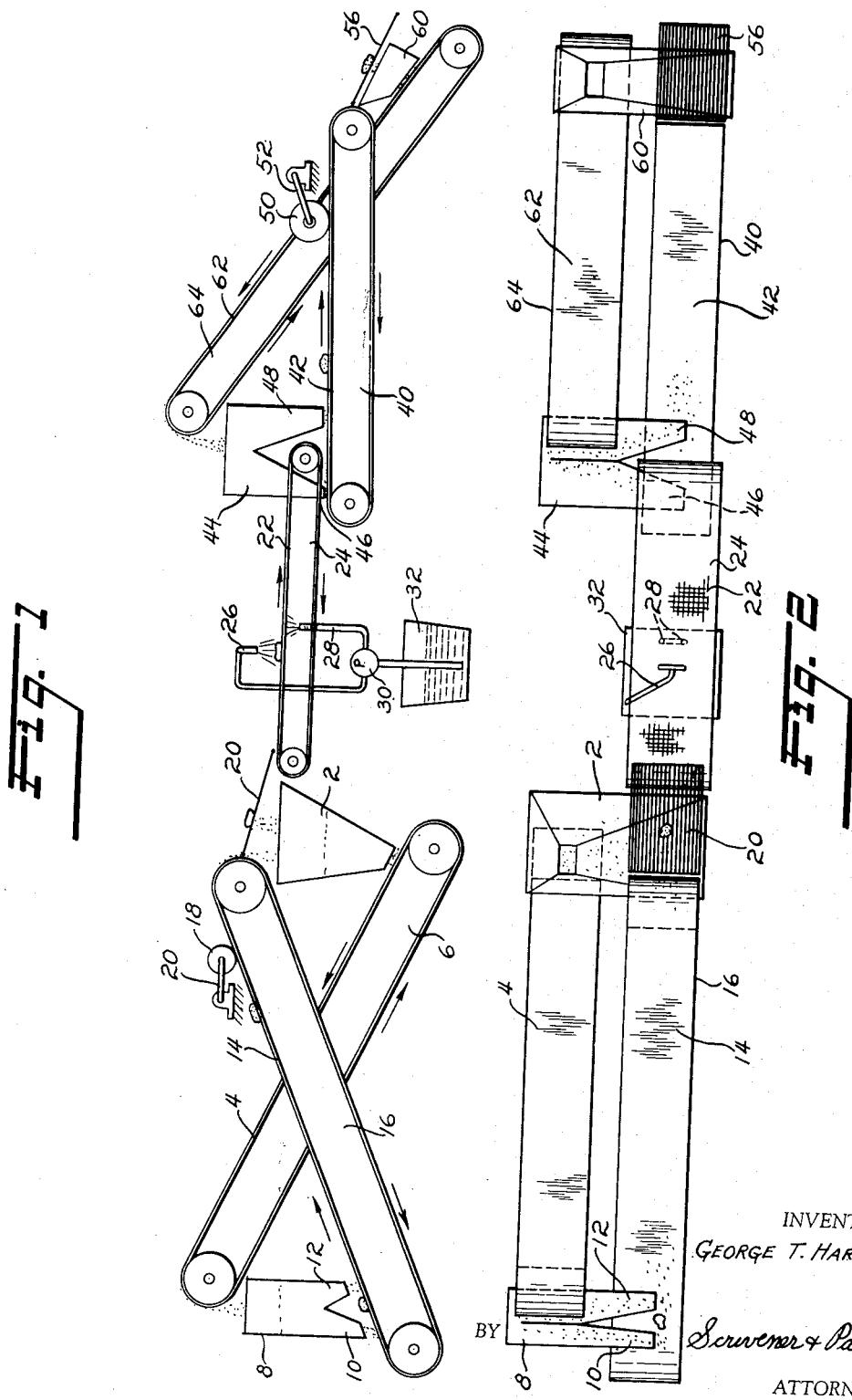
INVENTOR
GEORGE T. HARRISON
BY Scrivener & Parker
ATTORNEYS Patented Nov. 17, 1953

2,659,338

UNITED STATES PATENT OFFICE 2,659,338

MACHINE FOR COATING RAW OYSTERS

George Thomas Harrison, Tilghman, Md., assignor to Tilghman Packing Company, Tilghman, Md., a corporation of Maryland Application October 30, 1951, Serial No. 253,775

6 Claims. (Cl. 118—16)

This invention relates broadly to the preparation of food products and, more particularly, to the covering of such products with an edible coating. While the invention is not to be considered as limited to the covering of any particular food or other product, or to any particular coating material, it is of particular utility in the coating of raw, shucked oysters and in this application it will be so described.

It has been the principal object of my invention, which is achieved in the manner and by the means described in this patent, to provide a method and apparatus for applying an edible adherent coating to a food product such as a raw, shucked oyster.

Other objects and features of novelty of my invention will be made apparent by the following description and the appended claims, reference being made to drawings in which:

Fig. 1 is a generally schematic view of an oyster breading machine according to my invention, and Fig. 2 is a top plan view of such a machine.

A breading machine constructed and operative in accordance with my invention is disclosed in the drawings forming part of this application and comprises a hopper 2, the open lower end of which is positioned above the lowermost end of the upper reach 4 of an upwardly-inclined endless conveyor belt 6. Finely ground breading or similar material is contained in the hopper 2 and is fed from the lower end thereof to the upper reach 4 of the conveyor belt, by which it is moved upwardly. At the delivery end of the conveyor 6 the breading material falls from the reach 4 into a hopper 8 which has two discharge openings 10, 12 which are positioned above and spaced longitudinally of the upper reach 14 of a second endless conveyor belt 16 which is upwardly-inclined in a direction opposite to that of conveyor belt 6 and which is positioned adjacent and at the side of belt 6. A roller 18, which is carried by a pivoted arm 20, rests on the upper surface of the upper reach 14 of the conveyor belt 16 adjacent the upper end thereof and has a function which will be described hereinafter. The conveyor belt 16 moves in such a direction that the upper reach thereof moves upwardly, carrying with it the breading material delivered from the discharge openings 10, 12 of the hopper 8.

At the delivery end of the conveyor 16, and in position to receive anything delivered therefrom, is a downwardly-inclined screen 20 which may, if desired, be vibrated by any suitable means. Food products, including excess breading, traveling along the upper reach of conveyor 16 fall therefrom onto this screen and such products move along and down the screen by gravity, while the excess breading falls through the screen into the open, upper end of the hopper 2 which lies just below the screen. The food products pass along the screen and from it to the upper reach 22 of an endless wire belt conveyor 24 which forms a generally horizontal continuation of the screen 20. Above and below this wire belt are nozzles 26, 28 which are connected through a pump 30 to a reservoir of batter 32, whereby the articles on the wire belt will be sprayed from above and below with the batter.

At the delivery end of the upper reach of the endless wire belt 24 is a fourth endless conveyor belt 40, the inlet end of the upper reach 42 of which lies under the delivery end of the upper reach of the wire conveyor belt 24 so that articles on the upper reach 22 of belt 24 will be delivered therefrom to the upper reach 42 of belt 40. A second hopper 44 for breading material is disposed adjacent the inlet end of the reach 42 of belt 40 and this hopper has two outlet ports 46, 48 which are disposed above and spaced longitudinally of the reach 42 and, respectively, deliver breading material in front of and behind the point at which articles carried by the upper reach 22 of belt 24 fall onto the upper reach 42 of belt 40. A roller 50, carried by pivoted arm 52, rests on the upper surface of the upper reach 42 of conveyor 40. Adjacent the delivery end of the upper reach 42, and below it in a position to receive articles falling therefrom, is a downwardly-inclined screen 56 onto which the breaded articles and excess breading material fall from the upper reach 42. The breaded articles pass down the screen by gravity and are packed or otherwise treated, while the excess breading material falls through the screen into the open upper end of a hopper 60, the discharge opening in the bottom of which is positioned above the lowermost end of the upper reach 62 of an upwardly-inclined conveyor belt 64 which is positioned at the side of and adjacent the endless belt 40. The upper reach 62 of conveyor 64 carries this excess breading material upwardly to the discharge end thereof from which it falls into the hopper 44 for re-delivery through discharge ports 46, 48 to the upper reach 42 of conveyor belt 40.

In the operation of the described machine it will be assumed that raw oysters are to be breaded. Each raw, untreated oyster is placed on the upper reach 14 of the conveyor 16 between the discharge ports 10, 12 of the hopper 8. The breading material passing out of the leading discharge port 10 will fall on the reach 14 and coat the same so that when the oyster is placed on the reach at the described point it will immediately receive on its lower surface a coating of breading material. The material falling from the trailing port 12 will fall onto the upper and side surfaces of the oyster as the oyster passes under port 12 as the belt moves, thus completely covering the oyster with a coating of breading material. As the oyster moves with conveyor 16 it passes under the roller 18 which acts to press the breading coating to the oyster, thus making it adhere more firmly. When the coated oyster reaches the discharge end of reach 14 of conveyor 16 it will fall therefrom onto the downwardly-inclined screen 20 and will be delivered from the lower end of this screen to the inlet end of the upper reach 22 of endless belt 24. At the same time, excess breading material falling from the upper reach 14 onto the screen 20 will pass through the screen into the hopper 2 from which it will be re-delivered to the upper reach 4 of the conveyor 6. The breaded oyster on the wire belt 22 will be subjected to the upwardly and downwardly directed sprays of batter from nozzles 26, 28, thus completely coating the breaded oyster with liquid batter. The oyster thus coated will move along with the upper reach 22 of conveyor 24 and will fall therefrom onto the upper reach 42 of conveyor 40 at a point between the discharge openings 46, 48 of breading hopper 44, thus insuring that the batter-covered surface of the oyster will receive a complete coating of breading. After it leaves the hopper 44 the oyster will move to the discharge end of reach 42 from which it will fall onto the delivery screen 56. As it moves with conveyor 40 it passes under roller 50 which acts to press the breading and batter coatings to the oyster, making them adhere more firmly. Excess breading material falling from the upper reach 42 of conveyor 40 onto the screen 56 will pass through the screen into the hopper 60 from which it will be delivered by conveyor 64 to the hopper 44 from which it will be re-delivered to the upper reach 42 of conveyor 40.

It will be apparent that by the means provided by this invention an oyster or other food product will be given a first coating of an adherent material such as breading, then a coating of adherent batter, and then a second coating of breading material and that, by reason of the construction and arrangement of the parts, all surfaces of the oyster or other food product will be completely covered.

While I have described a machine for applying three coatings to the food product it will be apparent that within the scope of the invention additional coatings may be applied to the food product by utilization of means which are the same as or similar to those disclosed. It will also be apparent that within the scope of this invention products other than food products may be treated by the means disclosed. The disclosed means and apparatus are not to be considered, therefore, as limiting the invention in any way and a definition of the scope of the invention must be had by reference to the appended claims.

What is claimed is:

1. Apparatus for providing an edible coating to an edible food product such as an oyster which has such a texture that dry particles will adhere thereto, comprising a first endless conveyor belt on the upper reach of which un-coated edible products are adapted to be placed at a predetermined point, means for supplying dry, edible granular material to said upper reach at points behind and ahead of said pre-determined point whereby the entire outer surface of the product is covered, screening means at the delivery end of said conveyor belt to receive and separate the coated products and the excess granular material not adhering thereto, a second endless conveyor belt parallel to said first belt and which travels in a direction opposite to the direction in which said first conveyor belt travels, means for supplying dry granular material to the second belt, a third endless conveyor belt formed of open material and positioned to receive coated products from said screening means, means positioned adjacent said third belt for subjecting coated products thereon to oppositely directed sprays of an edible adherent liquid batter, a fourth endless conveyor belt positioned to receive coated products from the delivery end of said third belt at a pre-determined point on the upper reach thereof, and means for supplying dry edible granular particles to the upper reach of said fourth belt at points behind and ahead of said pre-determined point whereby the entire outer surface of the coated oyster is again covered with said dry particles.

2. Apparatus according to claim 1, in which the means for supplying dry granular material to the second conveyor belt comprises a hopper the open upper end of which is positioned below the screening means at the delivery end of the first conveyor belt.

3. Apparatus according to claim 1, in which the means for supplying dry granular material to the first conveyor belt comprises a hopper having two discharge openings which are spaced longitudinally of the first conveyor belt and are positioned behind and ahead of the pre-determined point at which the food product is placed on the first conveyor belt.

4. Apparatus according to claim 1, comprising in addition means for supplying excess granular material from the delivery end of the fourth conveyor belt to the means for supplying particles to the upper reach of the fourth belt.

5. Apparatus according to claim 4 in which such means comprise an endless conveyor belt having its inlet and delivery ends adjacent the delivery and inlet ends, respectively, of the fourth conveyor belt, and means at each pair of adjacent ends of said belts for receiving granular particles from the delivery end of one belt and delivering them to the inlet end of the other belt.

6. Apparatus according to claim 5, in which each of said last-named means comprises a hopper having its open upper end below the delivery end of one belt and its open discharge end above the other belt.

GEORGE THOMAS HARRISON.

References Cited in the file of this patent

UNITED STATES PATENTS

| Number | Name | Date |
|---|---|---|
| 2,347,164 | Petrilli | Apr. 18, 1944 |
| 2,551,849 | Petrilli | May 8, 1951 |
| 2,590,051 | Spain | May 18, 1952 |